US012515182B2

(12) United States Patent
Pan

(10) Patent No.: US 12,515,182 B2
(45) Date of Patent: Jan. 6, 2026

(54) WATER STIRRING APPARATUS FOR WATER LAMP HANDICRAFT

(71) Applicant: HUIZHOU DICHENG ELECTRONIC TECHNOLOGY CO., LTD, Huizhou (CN)

(72) Inventor: Binjie Pan, Huizhou (CN)

(73) Assignee: HUIZHOU DICHENG ELECTRONIC TECHNOLOGY CO., LTD, Huizhou (CN)

( * ) Notice: Subject to any disclaimer, the term of this patent is extended or adjusted under 35 U.S.C. 154(b) by 517 days.

(21) Appl. No.: 18/082,578

(22) Filed: Dec. 16, 2022

(65) Prior Publication Data

US 2024/0198303 A1 Jun. 20, 2024

(51) Int. Cl.

*B01F 33/453* (2022.01)
*B01F 27/053* (2022.01)
*B01F 27/113* (2022.01)

(52) U.S. Cl.

CPC ........ *B01F 33/4532* (2022.01); *B01F 27/053* (2022.01); *B01F 27/113* (2022.01)

(58) Field of Classification Search

CPC .............. B01F 33/4532; B01F 33/4531; B01F 33/453; B01F 33/45; B01F 27/113; B01F 27/053

See application file for complete search history.

(56) References Cited

U.S. PATENT DOCUMENTS

| | | | | |
|---|---|---|---|---|
| 4,162,855 | A * | 7/1979 | Bender | A47J 43/0465 366/274 |
| 4,209,259 | A * | 6/1980 | Rains | B01F 33/4535 366/273 |
| 7,762,716 | B2 * | 7/2010 | Terentiev | B01F 33/453 366/279 |
| 8,534,907 | B2 * | 9/2013 | Yum | B01F 21/10 366/279 |
| 9,550,157 | B2 * | 1/2017 | Erdenberger | B01F 33/452 |
| 9,815,035 | B2 * | 11/2017 | Werth | B01F 35/513 |
| 2015/0367302 | A1 * | 12/2015 | Gebauer | B01F 35/413 366/274 |
| 2016/0114300 | A1 * | 4/2016 | Pagliaro | B01F 27/41 366/273 |
| 2016/0333300 | A1 * | 11/2016 | Kronenberg | C12M 23/14 |

* cited by examiner

*Primary Examiner* — Marc C Howell
(74) *Attorney, Agent, or Firm* — Leong C. Lei

(57) ABSTRACT

A water stirring apparatus for a water lamp handicraft is provided, including a base, where a fixing bracket is arranged at a side of the base, the base and fixing bracket each have a fixing post, and a driving motor is located at another side of the base and connected to a main magnetic member; and an impeller, where the impeller includes fixing grooves at two ends, the fixing posts of the base and the fixing bracket are inserted into the fixing grooves at the two ends of the impeller respectively so that the impeller is mounted between the base and the fixing bracket, the impeller has an auxiliary magnetic member inside, and a plurality of blades is arranged on an outer wall of the impeller.

10 Claims, 8 Drawing Sheets

WATER STIRRING APPARATUS FOR WATER LAMP HANDICRAFT

BACKGROUND

Technical Field

The present invention relates to the field of water lamp handicraft technologies, and in particular, to a water stirring apparatus for a water lamp handicraft.

Related Art

Generally, water lamp handicrafts are filled with a liquid. In order to make the liquid inside show a flowing effect, it is necessary to use a water stirring apparatus inside the handicraft to stir the liquid, to make the handicraft more beautiful.

At present, an impeller in the existing water stirring apparatus is arranged with an extended fixing post at a top end, and the fixing post is used for mounting the top end of the impeller. However, a mounting manner of extending the fixing post at the top end makes the impeller less stable during rotation, resulting in a poor water stirring effect of the water stirring apparatus. In addition, there is an urgent need to improve the existing water stirring apparatus due to large noise during rotation of the impeller.

With years of experience in research on handcrafts, the inventor comes up with the idea of designing a water stirring mechanism that is more stable and produces less noise when stirring liquids, and after continuous trials and improvements, the present invention is thus proposed.

SUMMARY

An objective of the present invention is to provide a water stirring apparatus for a water lamp handicraft with a stable structure and a good silent effect.

To resolve the foregoing technical problems, the present invention adopts the following technical solutions:

A water stirring apparatus for a water lamp handicraft is provided, including:

- a base, where a fixing bracket is arranged at a side of the base, and the base and the fixing bracket each have a fixing post;
- a driving motor, arranged at another side of the base and connected to a main magnetic member; and
- an impeller, where the impeller includes fixing grooves at two ends, the fixing posts of the base and the fixing bracket are inserted into the fixing grooves at the two ends of the impeller respectively, so that the impeller is mounted between the base and the fixing bracket, the impeller has an auxiliary magnetic member inside, and a plurality of blades is arranged on an outer wall of the impeller,
- where when the driving motor drives the main magnetic member to rotate, due to the principle of magnetic attraction, the auxiliary magnetic member is driven to rotate, thereby making the impeller rotate.

In one of the embodiments, the impeller includes a main body and a water stirring impeller sleeve, where the fixing grooves are located at two ends of the main body, the main body includes a groove on a side wall, the water stirring impeller sleeve is a hollow structure and is sleeved in the groove, the auxiliary magnetic member is located inside the main body, and the plurality of blades is uniformly arranged on an outer wall of the water stirring impeller sleeve.

In one of the embodiments, the impeller includes a main body and a water stirring impeller sleeve, where the fixing grooves are located at two ends of the main body, and the main body includes a limiting groove/limiting boss on a side wall, the water stirring impeller sleeve is a hollow structure and includes a limiting boss/limiting groove on an inner wall, the limiting boss is engaged with the limiting groove for the water stirring impeller sleeve to be connected to the main body, the auxiliary magnetic member is located inside the main body, and the plurality of blades is uniformly arranged on an outer wall of the water stirring impeller sleeve.

In one of the embodiments, a first anti-slip protrusion is provided on a side wall of the groove or/and an inner wall of the water stirring impeller sleeve.

In one of the embodiments, a second anti-slip protrusion is provided on a side wall of the limiting groove or/and a side wall of the limiting boss.

In one of the embodiments, the main body is made of a soft rubber material.

In one of the embodiments, the fixing post is made of a soft rubber material.

In one of the embodiments, a soft rubber sleeve is arranged inside the fixing groove.

In one of the embodiments, at least two pins are arranged on the base, and the fixing bracket includes pin grooves corresponding to the pins.

In one of the embodiments, the water stirring apparatus for a water lamp handicraft further includes a circuit board, where the circuit board is connected to the base, and the driving motor is connected to the circuit board.

It should be noted that, the base in the present invention is used for sealing and covering the water lamp handicraft and forming an airtight space. The airtight space is filled with a liquid; sequins, glitter, or the like may be added to the filled liquid, and the fixing bracket and the impeller are located inside the airtight space. In addition, the driving motor outside the base drives the main magnetic member to rotate, and the auxiliary magnetic member in the impeller is magnetically attracted by and rotate along with the main magnetic member.

Beneficial Effects

1. The impeller includes the fixing grooves at two ends. During mounting of the impeller, the fixing posts of the base and the fixing bracket are inserted into the fixing grooves at the two ends of the impeller respectively, so that the impeller is mounted between the fixing bracket and the base to rotate. The design of the fixing grooves at the two ends improves the stability of the impeller during rotation.
2. The main body of the impeller is made of the soft rubber material, and the fixing grooves at the two ends of the main body are also made of the soft rubber material. Therefore, the two ends of the impeller may be flexibly connected to the base and the fixing bracket, so as to effectively reduce noise during rotation of the impeller, thereby improving a silent effect.
3. The main body of the impeller includes a groove on the outer wall, and the water stirring impeller sleeve is a hollow structure, thereby facilitating assembly between the main body and the water stirring impeller sleeve, so as to facilitate replacement of the blades of different sizes and improve adaptability of the impeller.

DETAILED DESCRIPTION

Figure 1:
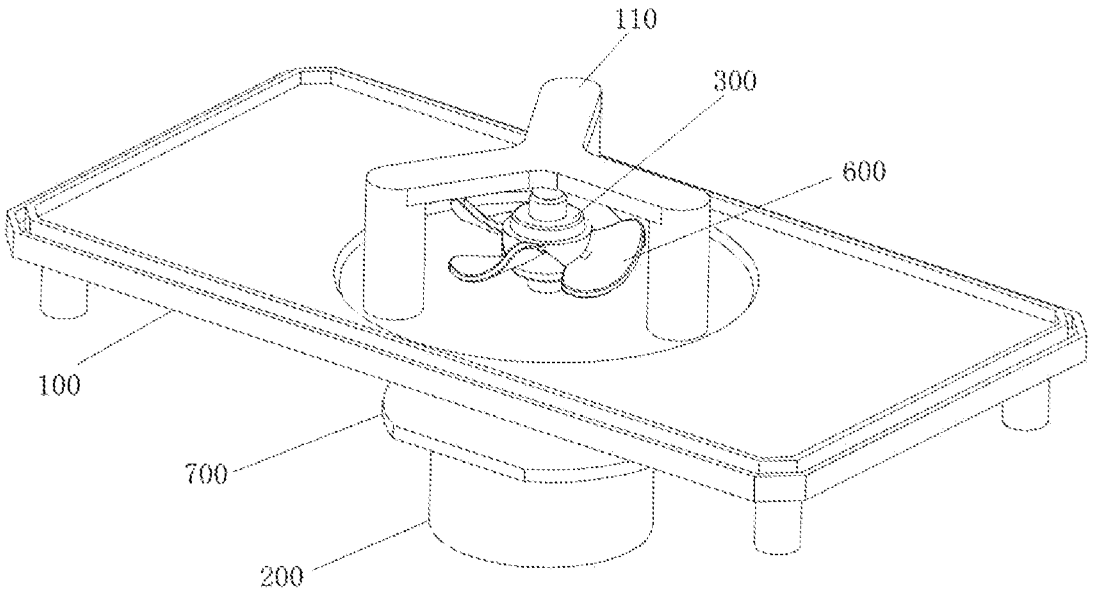
FIG. 1 is a schematic structural diagram of a water stirring apparatus for a water lamp handicraft according to Embodiment 1 of the present invention.
Figure 2:
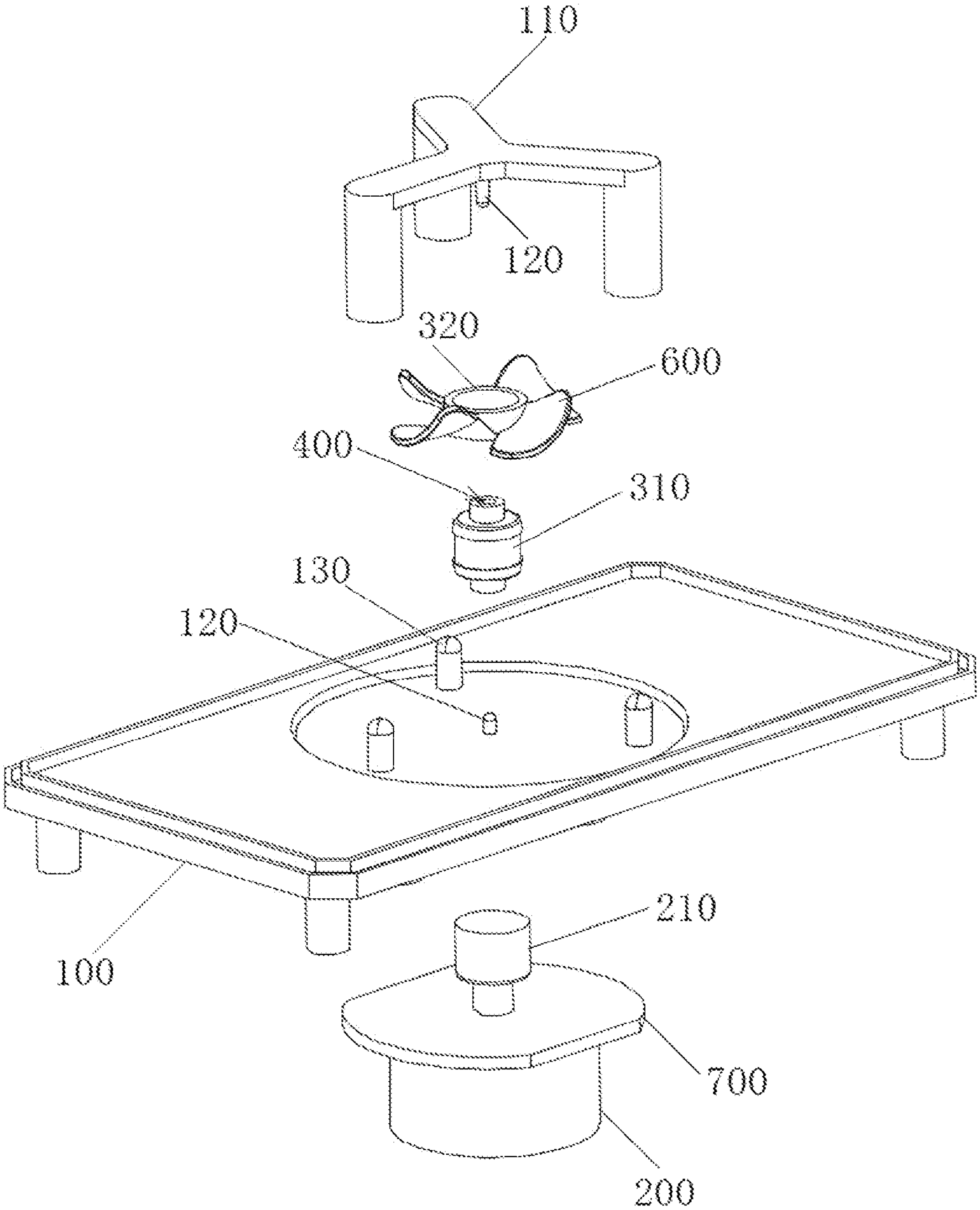
FIG. 2 is an exploded view of a water stirring apparatus for a water lamp handicraft according to Embodiment 1 of the present invention.

To make the foregoing objects, features, and advantages of the present invention more clearly understood, detailed description is made to specific implementations of the present invention below with reference to the accompanying drawings. In the following description, many specific details are described for fully understanding of the present invention. However, the present invention may be implemented in many other manners different from those described herein. A person skilled in the art may make similar improvements without departing from the connotation of the present invention. Therefore, the present invention is not limited to the specific embodiments disclosed below.

It should be noted that, when a component is referred to as "being fixed to" another component, the component may be directly on the another component, or an intervening component may be present. When a component is considered to be "connected to" another component, the component may be directly connected to the another component, or an intervening component may also be present. In contrast, when a component is referred to as being "directly on" or "directly connected to" another component, there is no intervening component. The terms "vertical", "horizontal", "left", and "right" and similar expressions used in this specification are merely used for the purpose of description.

Unless otherwise defined, meanings of all technical and scientific terms used in this specification are the same as those usually understood by a person skilled in the art to which the present invention belongs. In this specification, terms used in the specification of the present invention are merely intended to describe objects of the specific embodiments, but are not intended to limit the present invention. The term "and/or" used in this specification includes any and all combinations of one or more related listed items.

Embodiment 1

Referring to FIG. 1 to FIG. 5, a water stirring apparatus for a water lamp handicraft includes:

a base 100, where a fixing bracket 110 is arranged at a side of the base 100, and the base 100 and the fixing bracket 110 each have a fixing post 120;

a driving motor 200, arranged at another side of the base 100 and connected to a main magnetic member 210; and an impeller 300, where the impeller 300 includes fixing grooves 400 at two ends, the fixing posts 120 of the base 100 and the fixing bracket 110 are inserted into the fixing grooves 400 at two ends of the impeller 300 respectively, so that the impeller 300 is mounted between the base 100 and the fixing bracket 110, the impeller 300 has an auxiliary magnetic member 500 inside, and a plurality of blades 600 is arranged on an outer wall of the impeller 300.

Specifically, the base 100 in this embodiment is used for sealing and covering the water lamp handicraft. After the base 100 covers the water lamp handicraft, an airtight space is formed and can be filled with a liquid, and sequins, glitter, or the like may be added to the filled liquid. The fixing bracket 110 is located at a side of the base 100, that is, inside the airtight space, and the driving motor 200 is located at another side of the base 100, that is, outside the airtight space.

To improve stability of the impeller 300 during rotation, the impeller 300 includes the fixing grooves 400 at two ends. During mounting of the impeller 300, the fixing post 120 of the base 100 is inserted into the fixing groove 400 at a bottom end of the impeller 300, and the fixing post 120 of the fixing bracket 110 is inserted into the fixing groove 400 at a top end of the impeller 300, so that the impeller 300 is mounted between the base 100 and the fixing bracket 110. The impeller 300 is mounted more easily and has high stability during the rotation by the design of the fixing grooves 400 at the two ends of the impeller 300.

When the driving motor 200 drives the main magnetic member 210 to rotate, due to the principle of magnetic attraction, the auxiliary magnetic member 500 in the impeller 300 is magnetically attracted by and rotates along with the main magnetic member 210, thereby causing the impeller 300 to rotate and stirring the liquid inside the airtight space.

Figure 4:
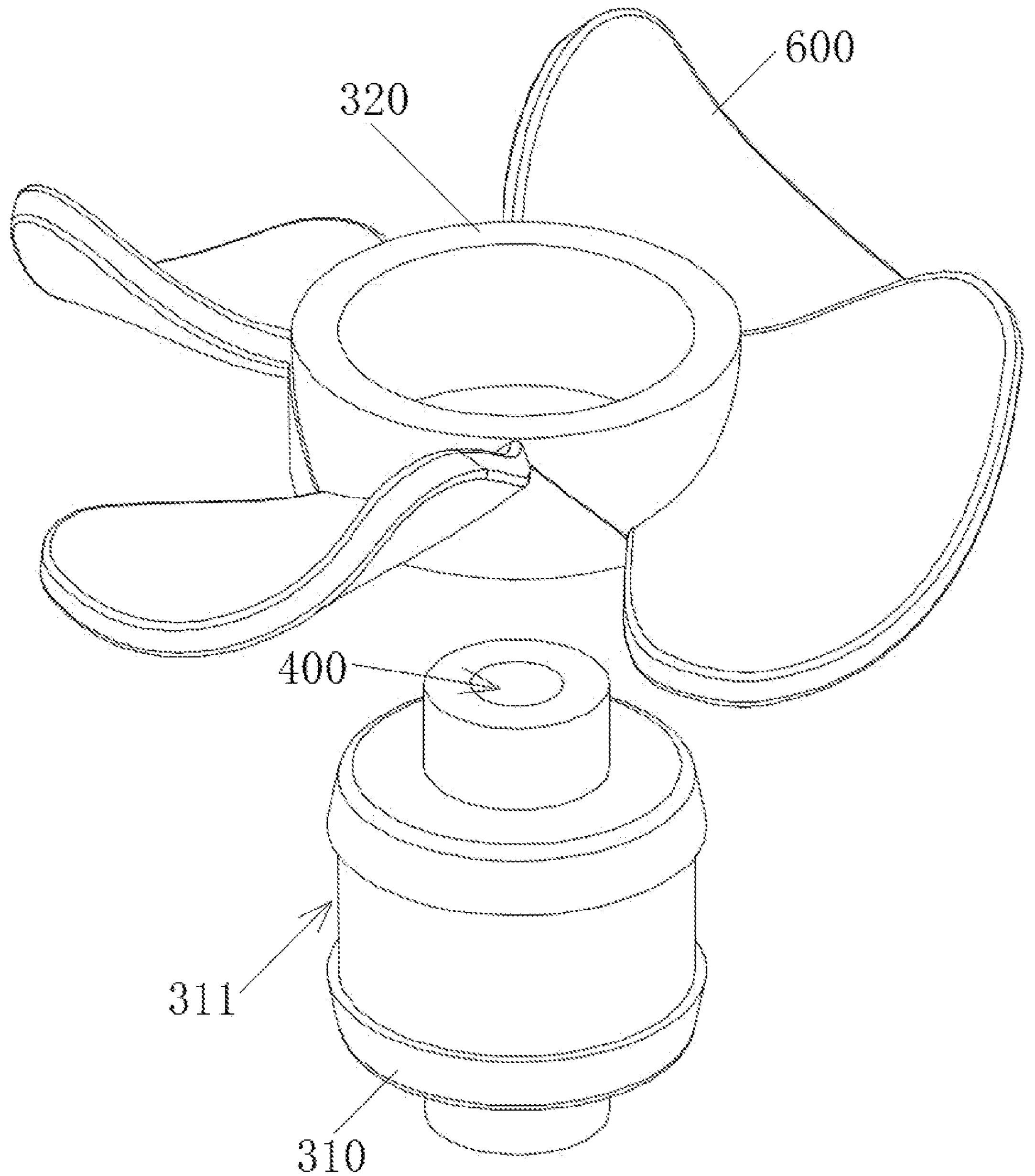
FIG. 4 is an exploded view of an impeller of a water stirring apparatus for a water lamp handicraft according to Embodiment 1 of the present invention.
Figure 5:
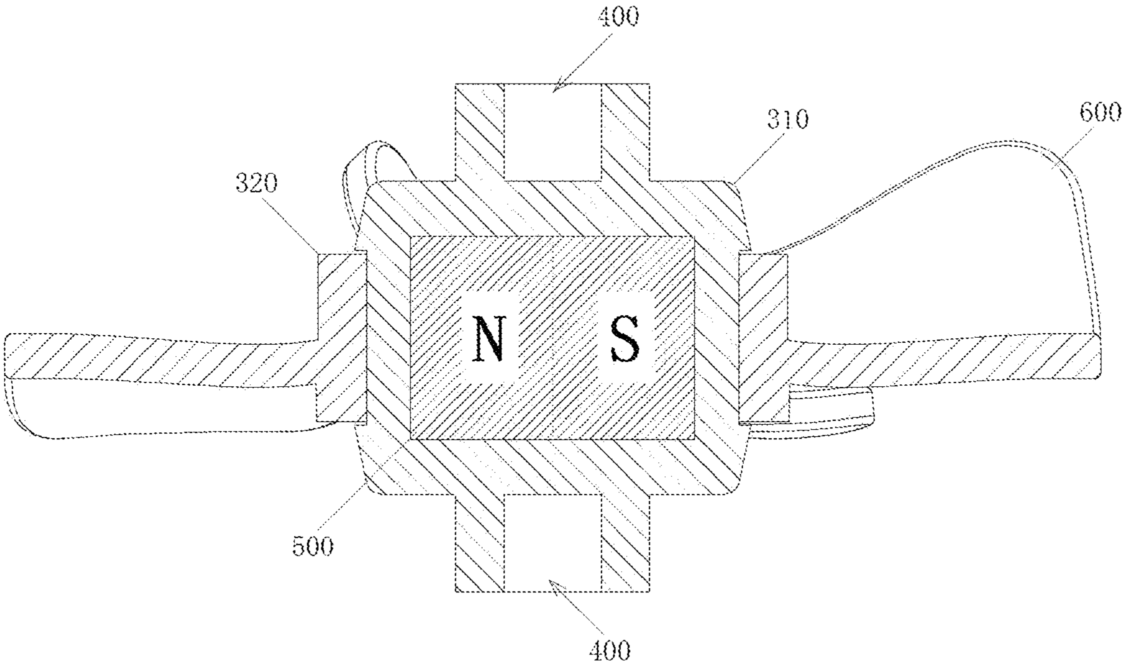
FIG. 5 is a sectional view of an impeller of a water stirring apparatus for a water lamp handicraft according to Embodiment 1 of the present invention.

In addition, referring to FIG. 4 and FIG. 5, due to the variety of the water lamp handicrafts, a size of the airtight space also varies. Therefore, to enable the impeller 300 to stir water in airtight spaces of different sizes, the impeller 300 in this embodiment includes a main body 310 and a water stirring impeller sleeve 320. The fixing grooves 400 are located at two ends of the main body 310, and the main body 310 includes a groove 311 on a side wall. The water stirring impeller sleeve 320 is a hollow structure and sleeved in the groove 311. A plurality of blades 600 is uniformly distributed on an outer wall of the water stirring impeller sleeve 320. During assembly of the impeller 300, the water stirring impeller sleeve 320 can be directly sleeved in the groove 311 of the main body 310, so as to facilitate the assembly of the impeller 300.

Figure 6:
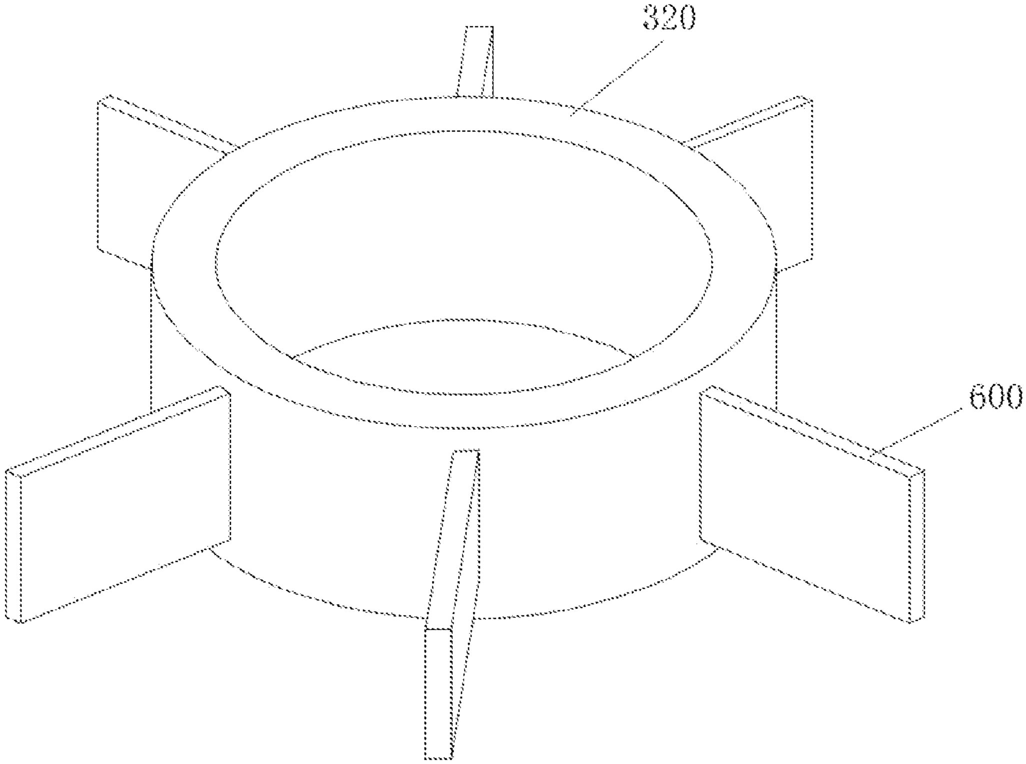
FIG. 6 is a schematic structural diagram of another blade of a water stirring apparatus for a water lamp handicraft according to Embodiment 1 of the present invention.
Figure 7:
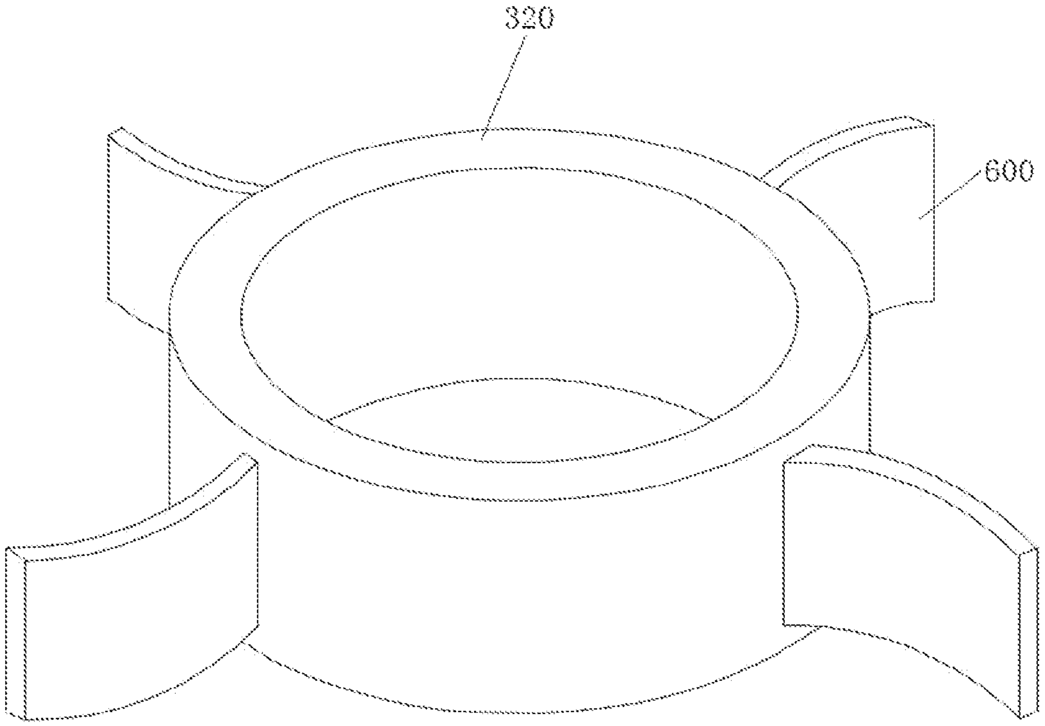
FIG. 7 is a schematic structural diagram of still another blade of a water stirring apparatus for a water lamp handicraft according to Embodiment 1 of the present invention.

Referring to FIG. 6 and FIG. 7, in order to stir water in an airtight space of a different size, it is only necessary to remove the water stirring impeller sleeve 320 from the main body 310 and use a water stirring impeller sleeve 320 having blades 600 of a different size, or use a water stirring impeller sleeve 320 having blades 600 of a different shape, or use a water stirring impeller sleeve 320 having blades 600 of a different size and a different shape, so that the blades 600 on the water stirring impeller sleeve 320 can stir the water in the airtight space of a different size, so as to ensure a water stirring effect of the impeller 300 and improve the adaptability of the impeller 300.

In addition, to make a connection between the main body 310 and the water stirring impeller sleeve 320 more stable, a surface of the groove 311 or a surface of an inner wall of the water stirring impeller sleeve 320 includes a first anti-slip protrusion (not shown), or certainly, the surface of the groove 311 and the surface of the inner wall of the water stirring impeller sleeve 320 each may include a first anti-slip protrusion. The connection between the main body 310 and the water stirring impeller sleeve 320 is closer by the first anti-slip protrusion, so as to effectively prevent the main body 310 from idling.

The impeller 300 produces noise during rotation. To reduce the noise, the main body 310 of the impeller 300 in this embodiment is made of a soft rubber material, and the fixing grooves 400 and the main body 310 are monolithic-formed. Therefore, the fixing grooves 400 at the two ends of the main body 310 are also made of the soft rubber material. When the impeller 300 rotates, since the fixing grooves 400 are flexibly connected to the fixing posts 120 of the base 100 and the fixing bracket 110, the noise produced during rotation of the impeller 300 can be effectively reduced, thereby improving a silent effect of the water stirring apparatus.

Figure 3:
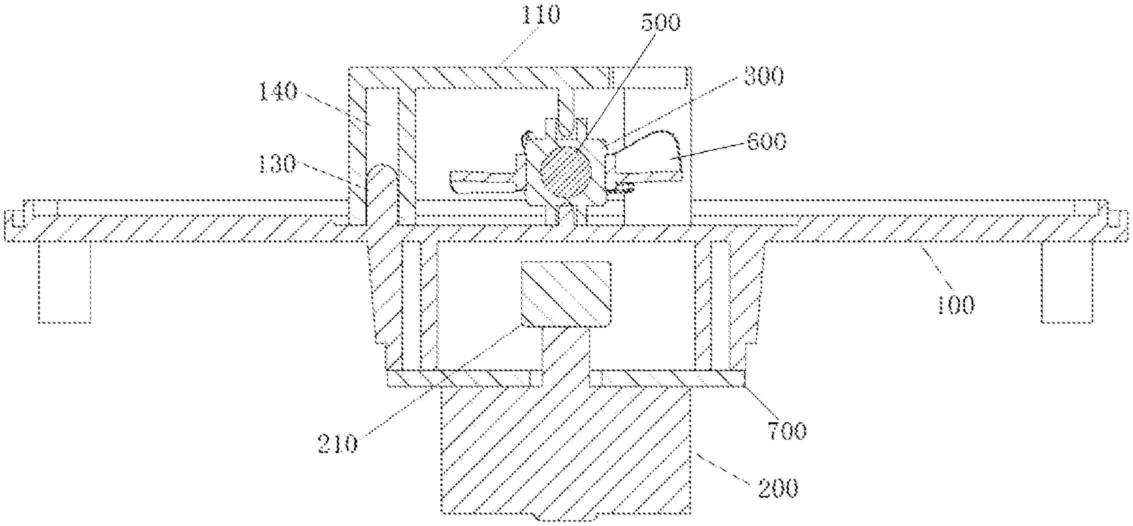
FIG. 3 is a sectional view of a water stirring apparatus for a water lamp handicraft according to Embodiment 1 of the present invention.

Referring to FIG. 3, in this embodiment, to facilitate the connection between the fixing bracket 110 and the base 100, a pin 130 is further arranged on the base 100, and the fixing bracket 110 includes a pin groove 140. When the fixing bracket 110 is mounted, the pin 130 is inserted into the pin groove 140, so that the fixing bracket 110 is connected to the base 100, and the impeller 300 is mounted more easily.

Finally, to improve the functionality of the water stirring apparatus, the water stirring apparatus for a water lamp handicraft further includes a circuit board 700, and the circuit board 700 has a patch LED. The patch LED can emit light to illuminate the water lamp handicraft to improve a visual effect. During assembly, the circuit board 700 is connected to the base 100 by a screw, and the driving motor 200 is also connected to the circuit board 700 by a screw. Therefore, the driving motor 200, the circuit board 700, and the base 100 are connected more compactly to reduce a whole volume of the water stirring apparatus.

Embodiment 2

Figure 8:
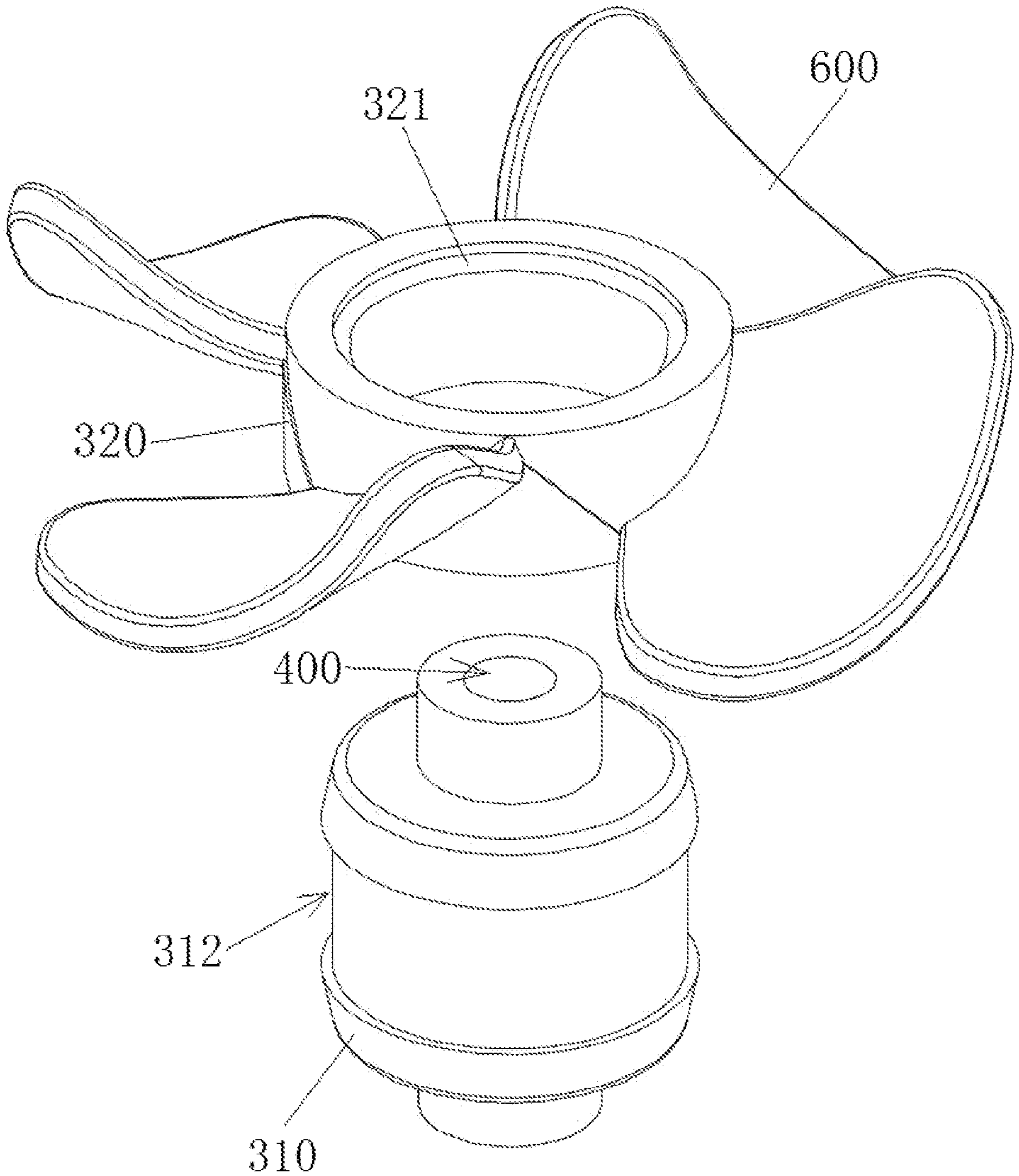
FIG. 8 is an exploded view of an impeller of a water stirring apparatus for a water lamp handicraft according to Embodiment 2 of the present invention.
Figure 9:
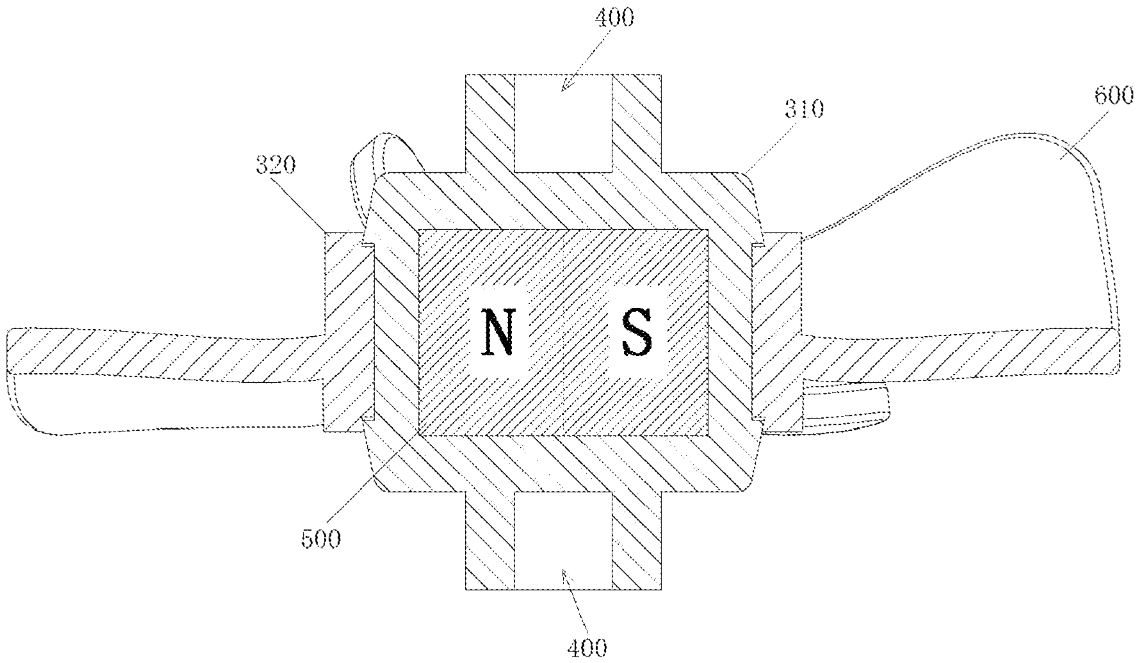
FIG. 9 is a sectional view of an impeller of a water stirring apparatus for a water lamp handicraft according to Embodiment 2 of the present invention.

Referring to FIG. 8 and FIG. 9, a water stirring apparatus for a water lamp handicraft in this embodiment has a basically same structure as the water stirring apparatus for a water lamp handicraft in Embodiment 1, except that: the impeller 300 includes a main body 310 and a water stirring impeller sleeve 320, where the fixing grooves 400 are located at two ends of the main body 310, and the main body 310 includes a limiting groove 312/limiting boss 321 on a side wall; the water stirring impeller sleeve 320 is a hollow structure and includes a limiting boss 321/limiting groove 312 on an inner wall, the limiting boss 321 is engaged in the limiting groove 312 for the water stirring impeller sleeve 320 to be connected to the main body 310, the auxiliary magnetic member 500 is located inside the main body 310, and the plurality of blades 600 is uniformly arranged on an outer wall of the water stirring impeller sleeve 320.

Specifically, to facilitate the assembly of the impeller 300 and improve adaptability of the impeller 300, the main body 310 may further be provided the limiting groove 312 or the limiting boss 321 on the side wall, and the water stirring impeller sleeve 320 may be provided the limiting boss 321 or the limiting groove 312 on the inner wall. By engaging the limiting boss 321 with the limiting groove 312, the water stirring impeller sleeve 320 may also be connected to the main body 310, so as to facilitate the assembly of the impeller 300. In this embodiment, the limiting groove 312 is located in the main body 310, and the limiting boss 321 is located in the water stirring impeller sleeve 320. Through fitting between the limiting groove 312 and the limiting boss 321, the impeller 300 can be easily assembled.

Certainly, in this embodiment, the water stirring impeller sleeve 320 may also be replaced. By changing a size or/and a shape of the blades 600 of the water stirring impeller sleeve 320, the blades 600 on the water stirring impeller sleeve 320 can implement water stirring for airtight spaces of different sizes, ensuring a water stirring effect of the impeller 300 and improving the adaptability of the impeller 300.

Similarly, to make a connection between the main body 310 and the water stirring impeller sleeve 320 more stable, a surface of the limiting groove 312 or a surface of the limiting boss 321 includes a second anti-slip protrusion (not shown). Certainly, the surfaces of the limiting groove 312 and the limiting boss 321 may both have the second anti-slip protrusions. The connection between the main body 310 and the water stirring impeller sleeve 320 is made tighter by the second anti-slip protrusion, so as to effectively prevent the main body 310 from idling.

Embodiment 3

A water stirring apparatus for a water lamp handicraft in this embodiment has a basically same structure as the water stirring apparatus for a water lamp handicraft in the above embodiments, except that: the fixing post 120 is made of a soft rubber material.

To effectively reduce noise produced during rotation of the impeller 300, in this embodiment, the fixing post 120 may be made of the soft rubber material. When the fixing post 120 is made of the soft rubber material, the connection with the fixing grooves 400 at two ends of the main body 310 of the impeller 300 is a flexible connection, so as to effectively reduce the noise produced during rotation of the impeller 300, thereby improving a silent effect of the water stirring apparatus.

Embodiment 4

A water stirring apparatus for a water lamp handicraft in this embodiment has a basically same structure as the water stirring apparatus for a water lamp handicraft in the above embodiments, except that: a soft rubber sleeve (not shown) is arranged inside the fixing groove 400.

Similarly, to effectively reduce noise produced during rotation of the impeller 300, in this embodiment, the soft rubber sleeve (not shown) may be arranged inside the fixing groove 400, or the soft rubber sleeve is sleeved on the fixing post 120. When the impeller 300 is mounted, the soft rubber sleeves are arranged between the fixing grooves 400 and the fixing posts 120 of the fixing bracket 110 and the base 100, so that the impeller 300 is flexibly connected to the base 100 and the fixing bracket 110, to effectively reduce the noise produced during rotation of the impeller 300, thereby improving a silent effect of the water stirring apparatus.

The above displays and describes basic principles, main features of the present invention and advantages of the present invention. A person skilled in the art can smoothly implement the present invention based on the accompany drawings of the specification and the above descriptions. However, all equivalent changes of variations, modifications, or evolutions made by a person skilled in the art using the above-disclosed technical content without departing from the scope of the technical solutions of the present invention are equivalent embodiments of the present invention. In addition, variations, modifications, or evolutions of any equivalent change made to the above embodiments according to the essential technology of the present invention still fall within the protection scope of the technical solution of the present invention.

What is claimed is:

1. A water stirring apparatus for a water lamp handicraft, comprising:

a base, wherein a fixing bracket is arranged at a side of the base, and the base and the fixing bracket each have a fixing post;

a driving motor, arranged at another side of the base and connected to a main magnetic member; and an impeller, wherein the impeller comprises fixing grooves at two ends, the fixing posts of the base and the fixing bracket are inserted into the fixing grooves at the two ends of the impeller respectively, so that the impeller is mounted between the base and the fixing bracket, the impeller has an auxiliary magnetic member inside, and a plurality of blades is arranged on an outer wall of the impeller, wherein when the driving motor drives the main magnetic member to rotate, due to the principle of magnetic attraction, the auxiliary magnetic member is driven to rotate, thereby making the impeller rotate;

wherein, a soft rubber sleeve is arranged inside the fixing grooves.

2. The water stirring apparatus for a water lamp handicraft according to claim 1, wherein the impeller comprises a main body and a water stirring impeller sleeve, wherein the fixing grooves are located at two ends of the main body, the main body comprises a groove on a side wall, the water stirring impeller sleeve is a hollow structure and is sleeved in the groove, the auxiliary magnetic member is located inside the main body, and the plurality of blades is uniformly arranged on an outer wall of the water stirring impeller sleeve.

3. The water stirring apparatus for a water lamp handicraft according to claim 1, wherein the impeller comprises a main body and a water stirring impeller sleeve, wherein the fixing grooves are located at two ends of the main body, and the main body comprises a limiting groove/limiting boss on a side wall, the water stirring impeller sleeve is a hollow structure and comprises a limiting boss/limiting groove on an inner wall, the limiting boss is engaged with the limiting groove for the water stirring impeller sleeve to be connected to the main body, the auxiliary magnetic member is located inside the main body, and the plurality of blades is uniformly arranged on an outer wall of the water stirring impeller sleeve.

4. The water stirring apparatus for a water lamp handicraft according to claim 2, wherein a anti-slip protrusion is provided on a side wall of the groove or/and an inner wall of the water stirring impeller sleeve.

5. The water stirring apparatus for a water lamp handicraft according to claim 3, wherein a anti-slip protrusion is provided on a side wall of the limiting groove or/and a side wall of the limiting boss.

6. The water stirring apparatus for a water lamp handicraft according to claim 2, wherein the main body is made of a soft rubber material.

7. The water stirring apparatus for a water lamp handicraft according to claim 3, wherein the main body is made of a soft rubber material.

8. The water stirring apparatus for a water lamp handicraft according to claim 1, wherein the fixing post is made of a soft rubber material.

9. The water stirring apparatus for a water lamp handicraft according to claim 1, wherein at least two pins are arranged on the base, and the fixing bracket comprises pin grooves corresponding to the pins.

10. The water stirring apparatus for a water lamp handicraft according to claim 1, further comprising a circuit board, wherein the circuit board is connected to the base, and the driving motor is connected to the circuit board.

* * * * *